United States Patent
Rajwan et al.

(10) Patent No.: US 10,474,216 B2
(45) Date of Patent: Nov. 12, 2019

(54) METHOD AND APPARATUS FOR PROVIDING POWER STATE INFORMATION USING IN-BAND SIGNALING

(71) Applicant: Intel Corporation, Santa Clara, CA (US)

(72) Inventors: Doron Rajwan, Rishon le-Zion (IL); Dorit Shapira, Atlit (IL); Itai Feit, Herzeliya (IL); Nadav Shulman, Tel Mond (IL); Efraim (Efi) Rotem, Haifa (IL); Tal Kuzi, Tel Aviv (IL); Eliezer Weissmann, Haifa (IL); Tomer Ziv, Rison Lezion (IL); Nir Rosenzweig, Givat Ella (IL)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/971,302

(22) Filed: Dec. 16, 2015

(65) Prior Publication Data

US 2017/0177065 A1 Jun. 22, 2017

(51) Int. Cl.
| | | |
|---|---|---|
| G06F 1/32 | (2019.01) | |
| G06F 13/42 | (2006.01) | |
| G06F 1/3234 | (2019.01) | |
| G06F 1/3287 | (2019.01) | |
| G06F 1/3296 | (2019.01) | |

(52) U.S. Cl.
CPC ......... G06F 1/3253 (2013.01); G06F 1/3287 (2013.01); G06F 1/3296 (2013.01); G06F 13/4282 (2013.01)

(58) Field of Classification Search
None
See application file for complete search history.

(56) References Cited

U.S. PATENT DOCUMENTS

| 2006/0153238 A1* | 7/2006 | Bar-On .................. H04L 12/40 370/473 |
|---|---|---|
| 2009/0259863 A1 | 10/2009 | Williams et al. |
| 2010/0191995 A1 | 7/2010 | Levy et al. |
| 2011/0035611 A1 | 2/2011 | Brey et al. |

(Continued)

OTHER PUBLICATIONS

Notification of Transmittal of the International Search Report and the Written Opinion of the International Searching Authority issued for International Patent Application No. PCT/US2016/055565 dated Jan. 23, 2017.

(Continued)

*Primary Examiner* — Idriss N Alrobaye
*Assistant Examiner* — Dayton Lewis-Taylor
(74) *Attorney, Agent, or Firm* — Womble Bond Dickinson (US) LLP (57) ABSTRACT

A method and apparatus for providing power state information using in-band signaling are described. In one embodiment, an integrated circuit (IC) device comprises a controller operable to receive a command from a platform control bus, the command requesting data that is unrelated to information about a power state in which the IC resides; and control logic operable to obtain data for inclusion in a response to the command, wherein the controller is operable to send the response over a bus, the response containing at least a portion of the data responsive to the command and containing power state information for the IC.

30 Claims, 6 Drawing Sheets (56) References Cited

U.S. PATENT DOCUMENTS

| | | |
|---|---|---|
| 2012/0089853 A1 | 4/2012 | Henderson et al. |
| 2012/0102346 A1* | 4/2012 | Haj-Yihia ............. G06F 1/3243 |
| | | 713/322 |
| 2014/0344595 A1 | 11/2014 | Jenne et al. |
| 2017/0177058 A1* | 6/2017 | Biggs ........................ G06F 9/00 |

OTHER PUBLICATIONS

International Preliminary Report on Patentability received for PCT Patent Application No. PCT/US2016/055565, dated Jun. 28, 2018, 12 pages.

* cited by examiner

METHOD AND APPARATUS FOR PROVIDING POWER STATE INFORMATION USING IN-BAND SIGNALING

FIELD OF THE INVENTION

Embodiments of the present invention relate to the field of power management for computing devices; more particularly, embodiments of the present invention relate to an integrated circuit (IC) providing its power state using in-band signaling.

BACKGROUND OF THE INVENTION

Battery life is a chief consideration in mobile computing device design. Various power signal schemes have been used and employed to achieve longer battery lives. Today, processors, systems-on-a-chip (SOCs) and other components in mobile computing devices often include power management capabilities that include the ability to place themselves into reduced power consumption states. For example, many processors can now place themselves in deep sleep states which include C-states C-8, C9 and C10. One problem associated with the use of such capabilities in devices is that other components in the platforms in which they reside are not aware that such devices have been powered down. Because they are not aware that such devices are powered down, these other components often send requests or attempt to communicate with these powered down devices. When this occurs, the powered down devices must wake up, respond to any requests, and then return to the powered down state.

Platform Environment Control Interface (PECI) is an external standard interface used by a number of computer systems manufactured by Original Equipment Manufacturers (EOMs) today. This interface gives OEMs ability to monitor and control the platform thermals, power, and additional items, via an entity called an Embedded Controller (EC). The PECI protocol is often used to obtain status information from the processor. At times, the EC may want to obtain multiple (e.g., five, ten, etc.) pieces of information from the processor. When this occurs, for each of the desired pieces of information, the EC sends a request to the processor. If the processor is in a sleep state, the processor must wake-up, restore the processor context, handle the request, send a response to the request, store the processor context, and thereafter power itself down. However, because there are often multiple pieces of information that are desired, the processor is constantly repeating this process of awakening out of the sleep state to handle each request individually and then returning to the sleep state. This is detrimental to overall performance of the processor. This problem has been compounded by the addition of deep C-states, referred to as C8, C9, C10, in which a Power Control Unit (PCU or P-Unit) in the processor responsible for power management is turned off. When that occurs, using PECI requires a platform wake event in order to serve the request, which has a high energy cost. As a result, OEMs are reluctant to use the PECI interface, because lowering the control-loop rate in order to reduce the energy cost hurts the platform performance and efficiency on high-power scenarios.

Some solutions to the problems above include providing physical signals (Deep Sleep, Deeper Sleep) that could be routed to the EC and used to determine if the processor is at deep C-states. Physical signals are an expensive resource and are not scalable to the increased number of sleep states. Therefore, such solutions are not desirable.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

A method and apparatus for providing power state status of an integrated circuit (IC) are described. In one embodiment, the IC is a processor, system-on-a-chip (SoC), or any device in a computer system. The techniques described herein allow components (e.g., an embedded controller, control unit, etc.) in a computer system platform to detect whether an IC in the platform is in an active or a sleep state (e.g., a drowse state or mode). In one embodiment, the detection is performed in a low power manner using a platform control bus.

Embodiments of the present invention include an IC (e.g., a processor, SoC, etc.) that is able to provide its power state status without exiting the power state within which it resides. In one embodiment, the IC includes a controller that is operable to receive commands from a platform control bus (e.g., a platform environment control interface (PECI) bus), where the command is requesting data that is unrelated to information about the power state in which the IC resides. In one embodiment, the command comprises a temperature command to obtain temperature data from the IC. The temperature data may indicate the temperature of a specific region of the IC or an average of multiple temperature readings taken across different regions of the IC.

In one embodiment, the IC also includes control logic/unit that is operable to obtain data for inclusion in response to the command. In one embodiment, this logic is part of the power control unit (PCU) of the IC, which is a unit that manages power for the IC. In one embodiment, for example, the data that is included in the response to the command includes power state information that indicates whether the IC is currently in one or more reduced power consumption states (e.g., sleep states). In other words, the power state information may indicate whether the IC is in the active or in a sleep state. In one embodiment, the sleep states may be one or more of the deep sleep or drowse mode states, such as, for example, C-states, C8, C9 and C10. In one embodiment, the power state information comprises a bit in the response to the command. For example, in one embodiment, where the command comprises a temperature command to obtain the temperature data for the IC, the response data that is sent by the IC in response to the command includes temperature data and includes power state information in its least significant bit (LSB). In one embodiment, one bit of temperature data that would have been sent in response to the command is replaced with a bit (e.g., the LSB) that indicates the power state information of the IC.

In one embodiment, when the response to the command is available or ready, the controller on the IC sends the response over the platform control bus. Thus, in this way, the IC is able to convey power state information indicative of the power state in which the IC resides to an external location, such as, for example, an embedded controller in the system, using in-band signaling over a bus (e.g., a platform controller bus, such as, for example, a PECI bus). This allows the IC to avoid having to add a separate pin, and supporting hardware logic, to indicate its power state to other components in the platform.

Figure 1A:
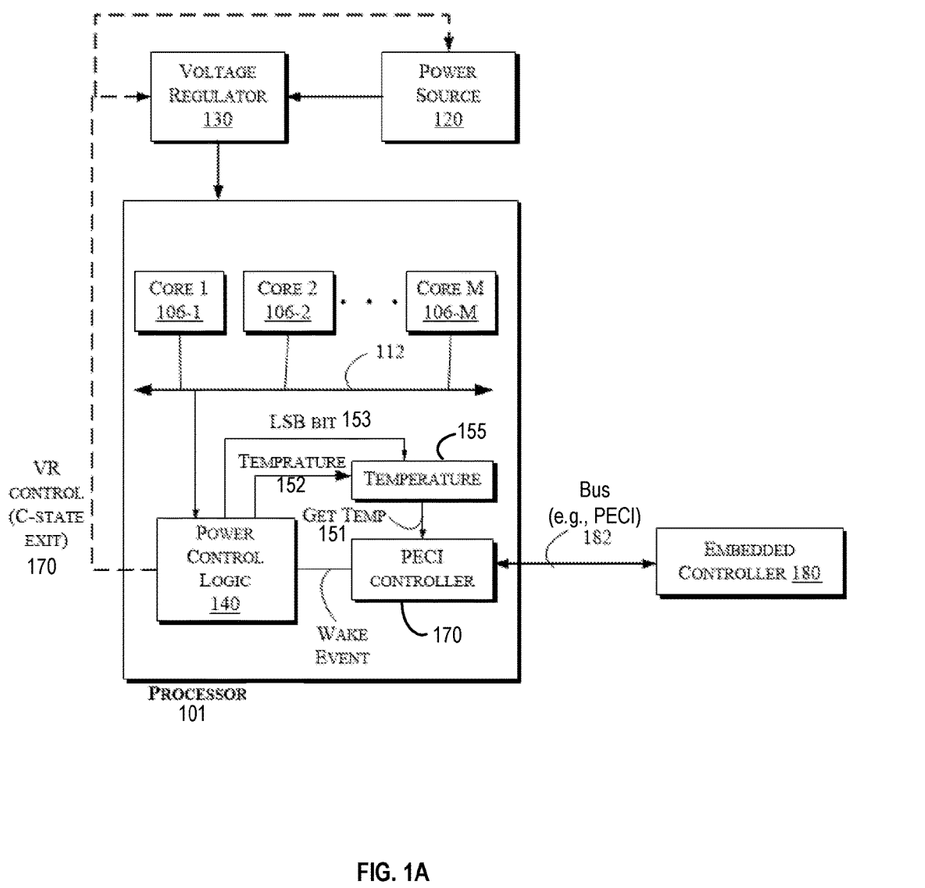
FIG. 1A is a block diagram of one embodiment of a computing system.

FIG. 1A is one embodiment of a computer system. Referring to FIG. 1A, the computer system includes a processor 101 coupled to an embedded controller 180 via bus 182. In one embodiment, bus 182 comprises a platform control bus, such as, for example, a Platform Environment Control Interface (PECI) bus. In another embodiment, bus 182 comprises an I2C bus. Note that the techniques described herein are extendable to other platform control buses and platform control entities.

The system also includes a voltage regulator 130 coupled to a power source 120 to provide voltage to processor 101. In another embodiment, voltage regulator 130 also provides power to other components in the system.

In one embodiment, processor 101 comprises a multi-core processor having M number of cores, labeled 106-1 to 106-M, where M is an integer. In one embodiment, cores 106-1 to 106-M are coupled to bus 112.

Power control logic 140 is also coupled to bus 112 and controls power for processor 101. Power control logic 140 is also coupled to voltage regulator 130 and/or power source 120. In one embodiment, power control logic 140 provides control signals 170 to voltage regulator 130. In one embodiment, control signals 170 indicate a power state of processor 101. For example, power control logic 140 may indicate in which power state (e.g., P-state, such as P0-P3 or a reduced power consumption C-state) that processor 101 is to the voltage regulator 130. In response to control signals 170, voltage regulator 130 controls the supply of power to processor 101 (e.g., reduces the amount of power provided to processor 101, increases the amount of power provided to processor 101, etc.).

In one embodiment, processor 101 also includes a controller 150 responsive to controls from embedded controller 180 sent on and received from bus 182. In one embodiment, controller 150 is a PECI controller that is responsive to PECI commands from embedded controller 180. In response to one or more PECI commands received over bus 182, controller 150 sends a wake event 160 to power control logic 140 to wake up processor 101 if it is in a sleep state to allow processor 101 to respond to the command that was received. For example, one of the PECI commands may be requesting status information associated with processor 101, and if received by controller 150 while processor 101 is in a sleep state (e.g., a C-state, such as for example, but not limited to, a deep sleep state C8, C9, or C10), controller 150 sends wakeup event 160 to power control logic 140, causing power control logic 140 to bring processor 101 out of the sleep state and into an active state to respond to the PECI command. In one embodiment, as part of transitioning processor 101 from a sleep state to an active state, power control logic 140 signals voltage regulator 130 and/or power source 120 using signals 170 to provide an increase in power to processor 101.

In one embodiment, processor 101 includes a temperature register (memory) 155 that receives and stores temperature data 152 and LSB 153. The temperature of processor 101 may be obtained from one or more temperature sensors (not shown) (e.g., digital temperature sensors (e.g., DTSs) in processor 101. Temperature readings made by these temperature sensors are sent to power control logic 140. In one embodiment, power control logic 140 determines an average of the temperatures from the temperature sensors. Power control logic 140 stores the temperature data in register 155. In one embodiment, the LSB of the temperature data is replaced with LSB bit 153 from power control logic 140. LSB bit 153 is a one bit indicator that indicates whether processor 101 is in an active state or a sleep state. Power control logic 140 sets LSB 153 to indicate processor 101 is in the sleep state in response to determining processor 101 is to enter a sleep state yet immediately prior to processor 101 entering the sleep state. Temperature data 152 and LSB bit 153 are sent by PECI controller 150 to embedded controller 180 over bus 182 in response to a get temperature (Get_Temp) command from embedded controller 180. In such a case, the data in temperature register 155 is provided to PECI controller 150, which sends it to embedded controller 180 over bus 182.

More specifically, in one embodiment, PECI 3.0 commands are answered by Pcode, the PCU firmware in power control logic 140. In one embodiment, PECI controller 150 includes an always-on logic for receiving PECI commands, providing a PECI wake up event to power control logic 140, and for sending responses to embedded controller 180 in response to the PECI commands that are received. However, there is one legacy command from PECI 1.0 referred to as GET_TEMP, which in one embodiment, is answered by hardware. In other words, the response to the GET_TEMP command doesn't require waking up processor 101. As such, the energy cost of that command is much lower, as need to open fewer voltage rails in order to answer it. Moreover, there is no need to perform context-save and context restore operations across many units, which reduces the energy cost furthermore.

In one embodiment, processor 101 uses in-band communication by the always-on logic of PECI controller 150 to communicate the sleep state status of processor 101 without waking the rest of processor 101. Using a response to the GET_TEMP command, processor 101 is able to leak the power state information of processor 101 (e.g., drowse mode (in C8/C9/C10)) to EC 180 using in band signaling rather than a dedicated hardware signal.

As discussed above, the LSB of the temperature data that would be reported in response to the GET_TEMP command is retargeted to contain a bit indicating the power state information of processor 101. In one embodiment, LSB bit 153 is a one bit indicator that indicates whether or not processor 101 is in a deep Package C-state (C8/C9/C10), referred to as drowse mode. Thus, in such a case, LSB bit 153 may be considered a drowse bit. Using the LSB bit of the response to the GET_TEMP command in this way enables embedded controller 180 to detect that information, while paying only fraction of the energy cost compared to prior approaches. Furthermore, as the temperature reporting accuracy is 1/64 degree Celsius, giving upon the LSB reduces the accuracy only by as little as 1/32 degree Celsius. Moreover, as the GET_TEMP command is fully answered by hardware, this hardware is a closed intellectual property (IP) block and should not be changed for another purpose.

In one embodiment, the temperature data 152 that is stored in temperature register 155 and LSB 153 is set prior to processor 101 enters a sleep, or reduced power consumption, state (e.g., deep sleep state). In one embodiment, both are set of the pcode of power control logic 140 before entering sleep state. In one embodiment, during regular temperature estimation, when the pcode is active, the pcode ensure the temperature LSB bit 153 is 0. Subsequently, immediately prior to entering sleep state (e.g., C8/C9/C10), the pcode sets the temperature LSB bit 153. Then, immediately after breaking out from the sleep state, the pcode clear the temperature LSB bit 153. When embedded controller 180 asks hardware to read the temperature using the GET_TEMP command, the value is already available to hardware in processor 101 (e.g., PECI controller 150) to respond as if LSB bit 153 was a temperature bit.

Figure 1B:
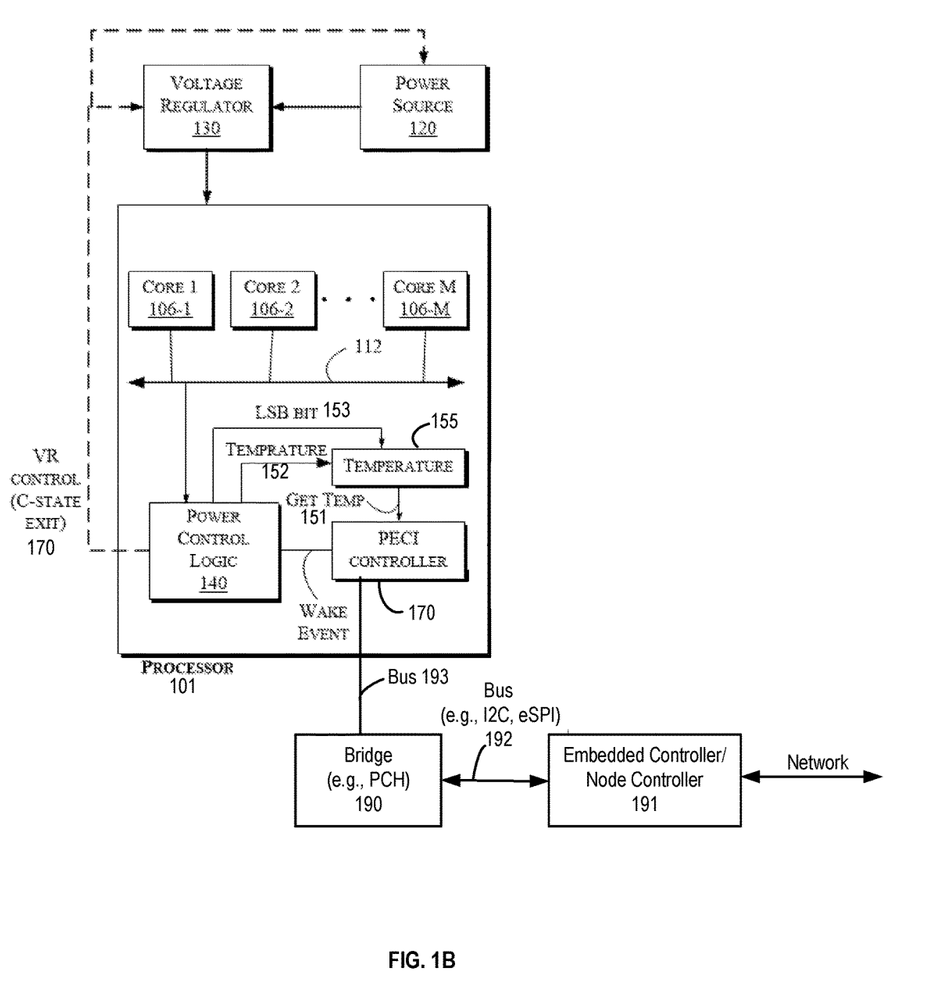
FIG. 1B is a block diagram of another embodiment of a computing system.

FIG. 1B is a block diagram of another embodiment of a computing system. Referring to FIG. 1B, the computing system is the same as in FIG. 1A, except the embedded controller 180 and PECI bus 182 are not included and a bridge 190 (e.g., peripheral control hub (PCH) is included with embedded controller 191. Embedded controller 191 is coupled to bridge (or router) 190 via bus 192. In one embodiment, bus 192 comprises an I2C bus. In other embodiments, bus 192 comprises an eSPI bus. Bridge 190 is coupled to PECI controller 170 via bus 193, which can be any number of buses (e.g., a DMI bus, PCIe bus, etc.). In such an arrangement, embedded controller 191 sends commands a get temperature command (e.g., GET_TEMP command) to PECI controller 170 via bus 192, bridge 190 and bus 193. That is, the commands for embedded controller 191 are tunneled from a bridge (PCH) based system to processor 101. Bridge 190 notifies embedded controller 191 about the sleep (power) state of processor 191 (not its sleep state). In one embodiment, bridge 190 participates in the sleep state flow of processor 101, such that when it knows, bridge 190 notifies embedded controller 191 about the state without actually obtaining it from processor 101 at that time. Furthermore, in one embodiment, bridge 190 delivers unrelated parameter(s) about itself (e.g., a bridge/PECI temperature) or caches a parameter of processor 101 (e.g., processor temperature) without reading it for each transition.

In one embodiment, embedded controller 191 is part of a node manager. In one embodiment, the node manager is a server entity that connects to a data center control fabric via a network.

Figure 2:
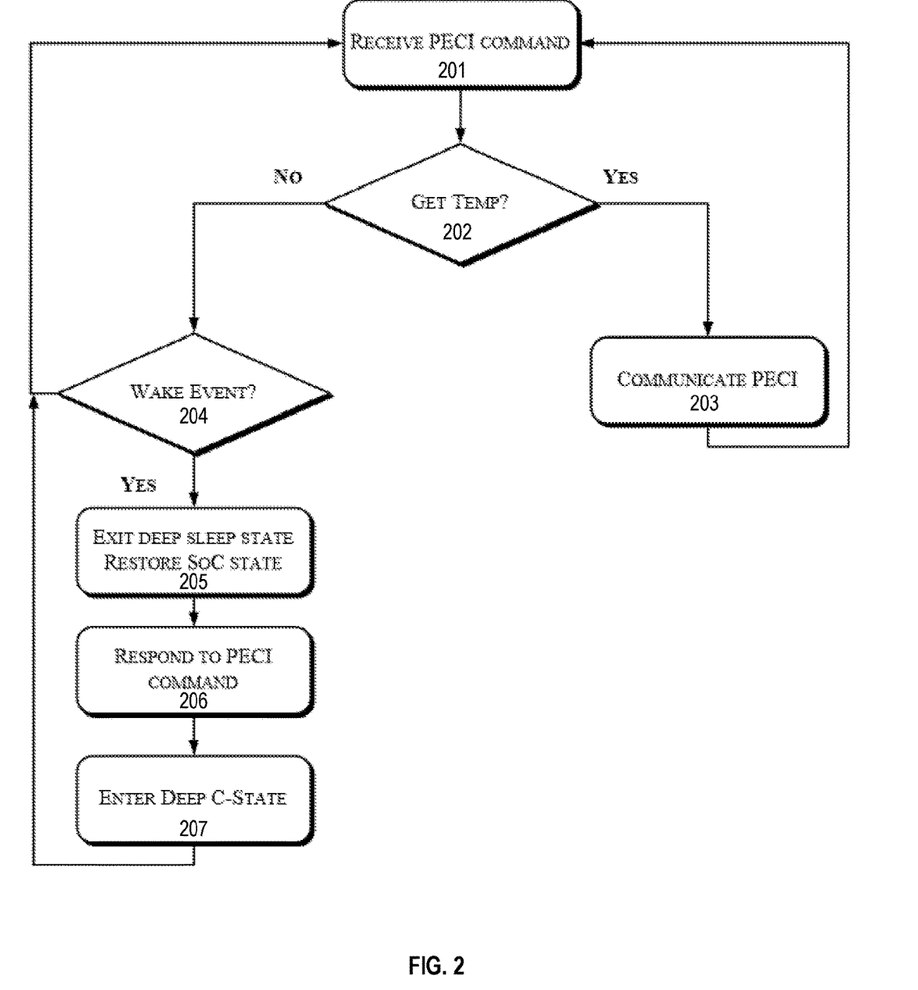
FIG. 2 is a flow diagram of one embodiment of a process for responding to PECI commands.

FIG. 2 is a flow diagram of one embodiment of a process for responding to PECI commands. In one embodiment, the process is performed by processing logic that may comprise hardware (circuitry, dedicated logic, etc.), software (such as is run on a general purpose computer system or a dedicated machine), firmware, or a combination of the three. In one embodiment, the process is performed by a PECI controller in a processor (e.g., PECI control 150).

Referring to FIG. 2, the process begins by processing logic receiving a PECI command (processing block 201). In response to the PECI command, processing logic in the PECI controller determines whether the command is a GET_TEMP (get temperature) command (processing block 202). If it is, processing logic transitions to processing logic 203 where processing logic in the processing controller responds to the PECI command over the PECI bus by providing the data from the temperature storage, which includes the power state information (e.g., LSB bit).

If processing logic determines that the PECI command is not a GET_TEMP (get temperature) command, processing logic transitions to processing block 204 where processing logic in the processing controller determines whether the command is a wake-up event. If not, processing logic transitions to processing block 201 where processing logic in the PECI controller waits for another PECI command. If processing logic of the PECI controller determines that the command is a wake-up event, processing logic in the PECI controller generates the wake-up event and causes the processor to exit of the deep sleep state and processing logic restores the processor state (processing block 205). Then processing logic responds to the PECI command (processing block 206). In one embodiment, the power control logic in the processor generates a response to the PECI command and sends it to the PECI controller to report the response to a location external to the processor (e.g., an embedded controller in the system).

After generating and responding to the PECI command, processing logic causes the processor to enter the deep C-state (processing block 207). In one embodiment, the processing logic that causes the processor to enter the deep C-state is the power control logic.

Figure 3:
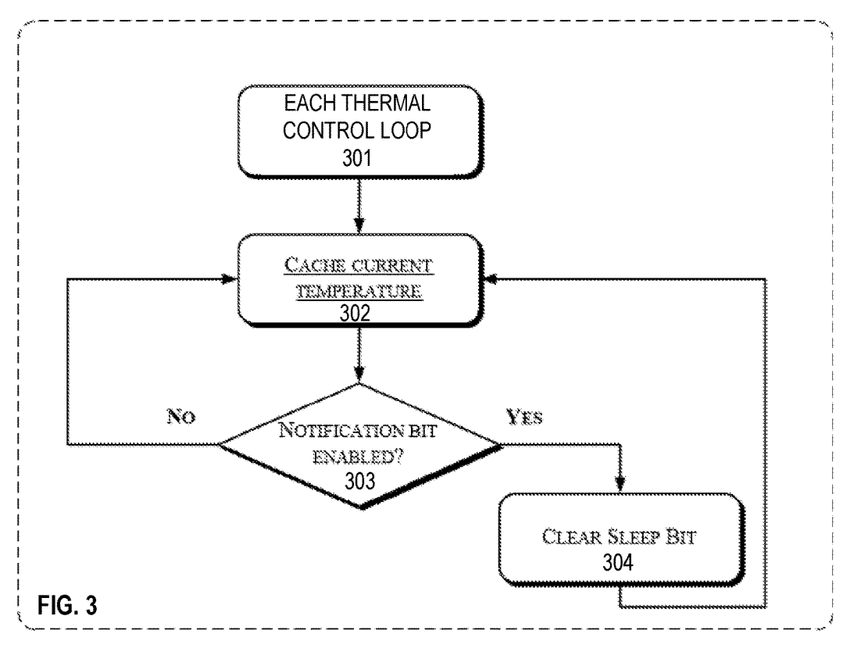
FIG. 3 is a flow diagram of one embodiment of a process for generating the data for a potential response for a response to get temperature at data.

FIG. 3 is a flow diagram of one embodiment of a process for generating the data for a potential response to a command to get temperature data and set the LSB bit. The process may be performed by processing logic that may comprise hardware (circuitry, dedicated logic, etc.), software (such as is run on a general purpose computer system or a dedicated machine), firmware, or a combination of the three.

Referring to FIG. 3, the process begins by performing a thermal control loop (processing block 301). As part of the process, processing logic caches the current temperature (processing block 302) and then tests whether the notification bit has been enabled, indicating that the LSB of the temperature data is being used as the power state indicator (processing block 303). If it has been enabled, the process transitions to processing block 303 where processing logic clears the sleep or drowse (power state information) bit and transitions back to processing block 302. If the notification bit is not enabled, the process transitions to processing block 302 without clearing the sleep/drowse bit.

Figure 4:
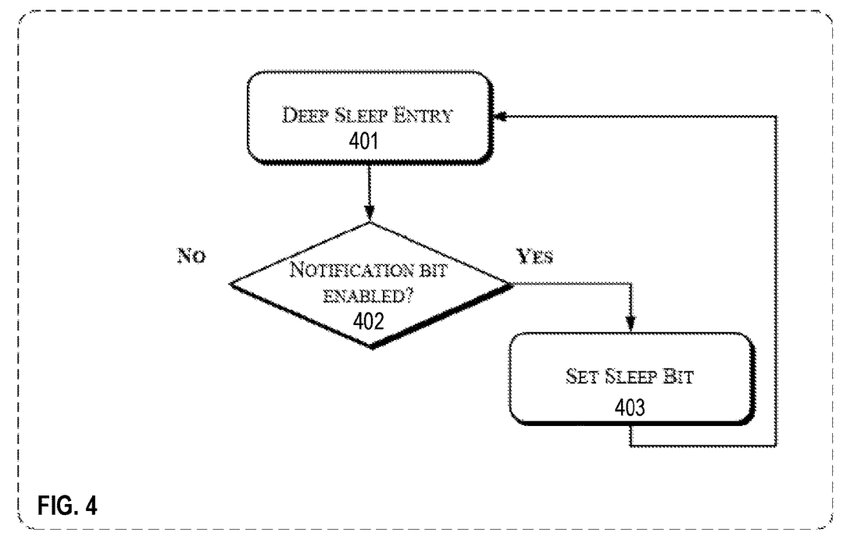
FIG. 4 illustrates one embodiment of a process for preparing a processor to respond with sleep state information while in the deep sleep state.

FIG. 4 is one embodiment of a process for preparing a processor to setting the power state information. The process is performed by processing logic that may comprise hardware (circuitry, dedicated logic, etc.), software (such as is run on a general purpose computer system or a dedicated machine), firmware, or a combination of the three.

Referring to FIG. 4, the process begins by receiving a notification that the deep sleep state is to entered by the processor (processing block 401). In response to receiving such an indication, processing logic determines whether the notification bit has been enabled (processing block 402). If it has not, the process ends. If it has, then the process transitions to processing block 403 where processing logic sets the sleep/drowse (power state information) bit and the process transitions back to processing block 401 and waits the processor is entering the deep sleep state again.

Figure 5:
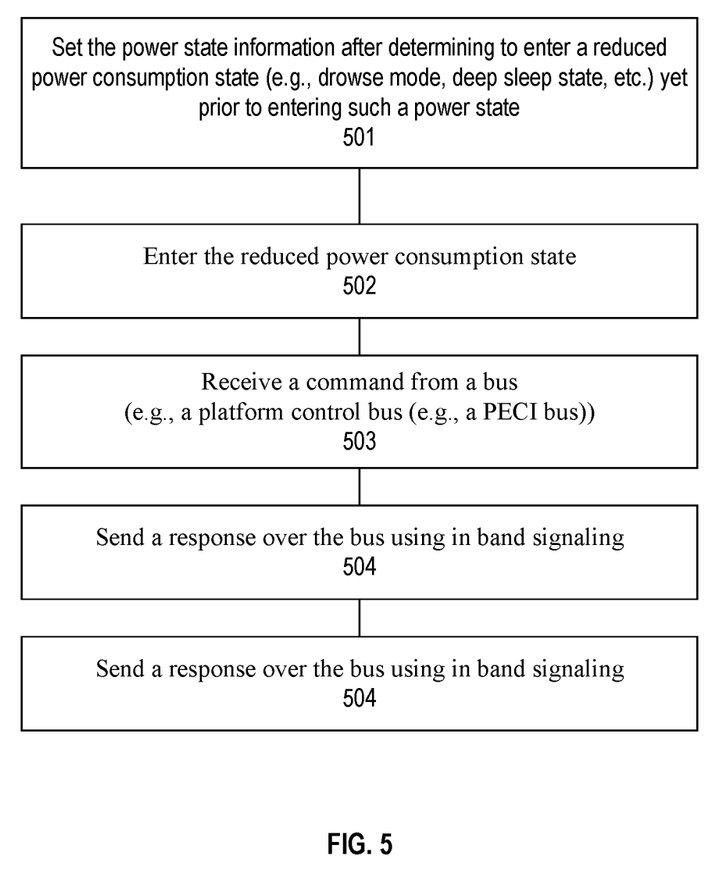
FIG. 5 is a flow diagram of one embodiment of a process for indicating an integrated circuit's power state.

FIG. 5 is a flow diagram of one embodiment of a process for indicating an integrated circuit (IC) power state. The process may be performed by processing logic that may comprise hardware (circuitry, dedicated logic, etc.), software (such as is run on a general purpose computer system or a dedicated machine), firmware, or a combination of the three.

Referring to FIG. 5, the process begins by processing logic setting the power state information after determining to enter a reduced power consumption state (e.g., drowse mode, deep sleep state, etc.) yet prior to entering such a power state (processing block 501). In one embodiment, setting the power state information comprises setting a bit in a register (e.g., a temperature register) that is used to store data responsive to a command (e.g., a status request) made upon the IC. Next, processing logic in the IC enters the reduced power consumption state (processing block 502).

Thereafter, processing logic receives a command from a bus (e.g., a platform control bus (e.g., a PECI bus)) (processing block 503). In one embodiment, the command requests data that is unrelated to information about the power state in which the IC resides. In one embodiment, the command is a temperature command that requests temperature information about the IC.

In response to the command, processing logic sends a response over the bus using in band signaling (processing block 504). In one embodiment, the response contains at least a portion of the data responsive to the command and contains power state information for the IC. For example, in one embodiment, the command comprises a temperature command to obtain temperature data for the IC, and in such a case, the response includes temperature data associated with the temperature of the IC and includes one bit indicative of the power state in which the IC resides. In one embodiment, the one bit replaces the LSB of the temperature data.

The techniques described herein as beneficial in a number of ways. By allowing the power state of the processor to be provided externally without powering up the processor (or other IC), the trade off the OEMs face greatly improves. The OEM can choose to increase the thermal control-loop rate by over 10×, tracking better high-power scenarios, while lowering the rate at deep sleep state and keeping the same energy cost as today, or, can decide to keep the rate as today and lower the power, which will increase the battery life of the product.

By having the commands over PECI, OEMs can implement this change without a change in the Basic Input Output System (BIOS). Note that coordination is needed with the embedded controller in the system (e.g., embedded controller 180 of FIG. 1A) to recognize the meaning of the power state indication (e.g., the LSB bit of the temperature data received in response to a GET_TEMP command. Note that new PECI 3.0 commands to query the existence of this feature, setting it, or removing it can be added.

In one embodiment, the embedded controller in the system (e.g., embedded controller 180 of FIG. 1A) takes advantage of this feature. For example, the embedded controller could issue a first command in order to query the temperature, and if processor is in a reduced power consumption state (e.g., drowse mode), the embedded controller determines that it will skip, or at least delay, all other command it intended to issue. There may be race-conditions in such a case, as the system can enter and exit sleep state any time, but the goal of the techniques described herein is to lower average power, hence some false alarms or some misdetections are insignificant in terms of average power.

Note that the techniques described herein can be extended to other architectures and implementations. In one embodiment, such architectures and implementations would include a control link is that it has an always-on logic to parse an incoming communication and wake up the host, with the ability to provide some basic response while off-line (e.g., while remaining in a reduced power consumption state).

An Example of a System Containing a Low Power Detection Scheme

Figure 6:
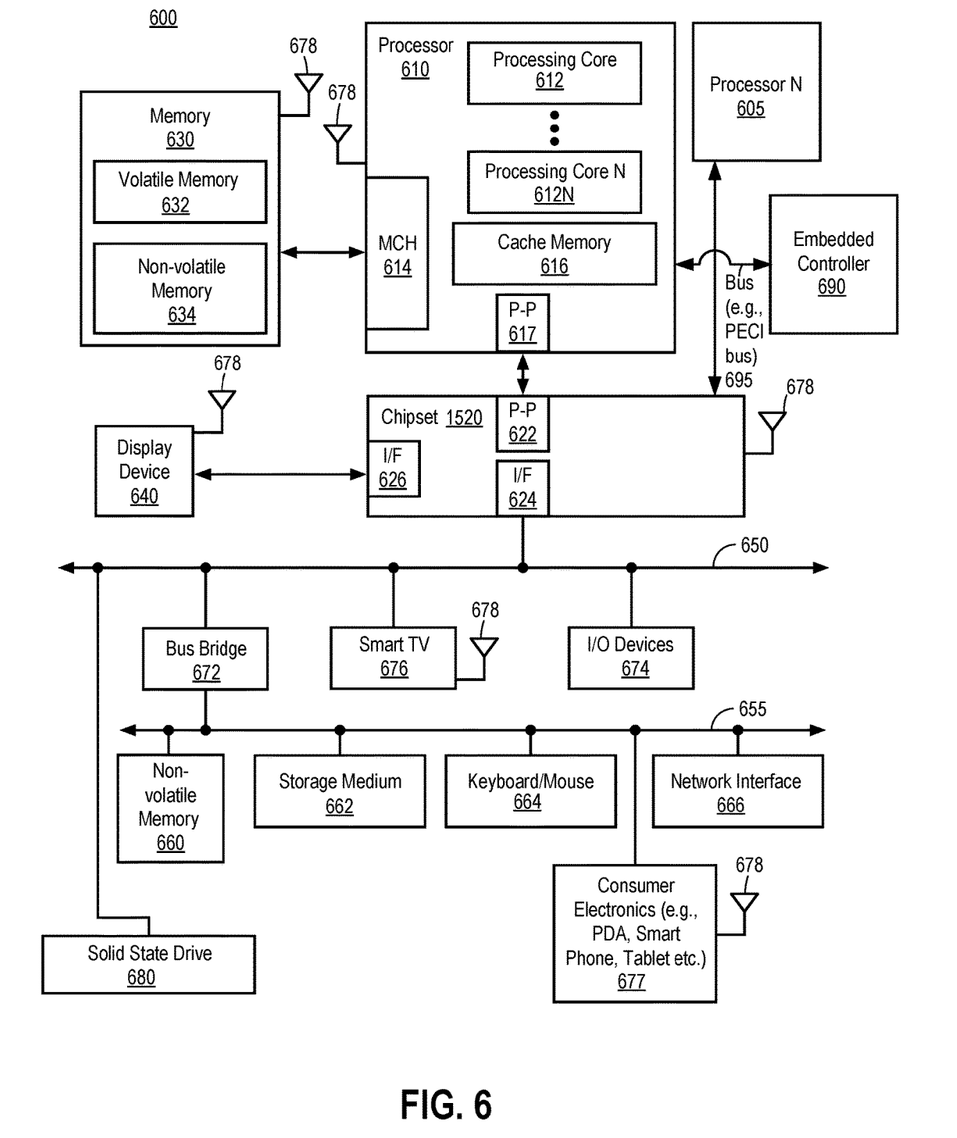
FIG. 6 is a block diagram of one embodiment of a computer system.

FIG. 6 is one embodiment of a system level diagram 600 that may incorporate the techniques described above. For example, the techniques described above may be incorporated into a processor in system 600 or other part of system 600.

Referring to FIG. 6, system 600 includes, but is not limited to, a desktop computer, a laptop computer, a netbook, a tablet, a notebook computer, a personal digital assistant (PDA), a server, a workstation, a cellular telephone, a mobile computing device, a smart phone, an Internet appliance or any other type of computing device. In another embodiment, system 600 implements the methods disclosed herein and may include a system on a chip (SOC) system.

In one embodiment, processor 610 has one or more processor cores 612 to 612N, where 612N represents the Nth processor core inside the processor 610 where N is a positive integer. In one embodiment, system 600 includes multiple processors including processors 610 and 605, where processor 605 has logic similar or identical to logic of processor 610. In one embodiment, system 600 includes multiple processors including processors 610 and 605 such that processor 605 has logic that is completely independent from the logic of processor 610. In such an embodiment, a multi-package system 600 is a heterogeneous multi-package system because the processors 605 and 610 have different logic units. In one embodiment, processing core 612 includes, but is not limited to, pre-fetch logic to fetch instructions, decode logic to decode the instructions, execution logic to execute instructions and the like. In one embodiment, processor 610 has a cache memory 616 to cache instructions and/or data of the system 600. In another embodiment of the invention, cache memory 616 includes level one, level two and level three, cache memory, or any other configuration of the cache memory within processor 610.

In one embodiment, processor 610 includes a memory control hub (MCH) 614, which is operable to perform functions that enable processor 610 to access and communicate with a memory 630 that includes a volatile memory 632 and/or a non-volatile memory 634. In one embodiment, memory control hub (MCH) 614 is positioned outside of processor 610 as an independent integrated circuit.

In one embodiment, processor 610 is operable to communicate with memory 630 and a chipset 620. In such an embodiment, SSD 680 executes the computer-executable instructions when SSD 680 is powered up.

In one embodiment, processor 610 is also coupled to a wireless antenna 678 to communicate with any device configured to transmit and/or receive wireless signals. In one embodiment, wireless antenna interface 678 operates in accordance with, but is not limited to, the IEEE 802.11 standard and its related family, HomePlug AV (HPAV), Ultra Wide Band (UWB), Bluetooth, WiMAX, or any form of wireless communication protocol.

In one embodiment, the volatile memory 632 includes, but is not limited to, Synchronous Dynamic Random Access Memory (SDRAM), Dynamic Random Access Memory (DRAM), RAMBUS Dynamic Random Access Memory (RDRAM), and/or any other type of random access memory device. Non-volatile memory 634 includes, but is not limited to, flash memory (e.g., NAND, NOR), phase change memory (PCM), read-only memory (ROM), electrically erasable programmable read-only memory (EEPROM), or any other type of non-volatile memory device.

Memory 630 stores information and instructions to be executed by processor 610. In one embodiment, chipset 620 connects with processor 610 via Point-to-Point (PtP or P-P) interfaces 617 and 622. In one embodiment, chipset 620 enables processor 610 to connect to other modules in the system 600. In one embodiment, interfaces 617 and 622 operate in accordance with a PtP communication protocol such as the Intel QuickPath Interconnect (QPI) or the like.

In one embodiment, chipset 620 is operable to communicate with processor 610, 605, display device 640, and other devices 672, 676, 674, 660, 662, 664, 666, 677, etc. In one embodiment, chipset 620 is also coupled to a wireless antenna 678 to communicate with any device configured to transmit and/or receive wireless signals.

In one embodiment, chip set 620 connects to a display device 640 via an interface 626. In one embodiment, display device 640 includes, but is not limited to, liquid crystal display (LCD), plasma, cathode ray tube (CRT) display, or any other form of visual display device. In addition, chipset 620 connects to one or more buses 650 and 655 that interconnect various modules 674, 660, 662, 664, and 666. In one embodiment, buses 650 and 655 may be interconnected together via a bus bridge 672 if there is a mismatch in bus speed or communication protocol. In one embodiment, chipset 620 couples with, but is not limited to, a non-volatile memory 660, a mass storage device(s) 662, a keyboard/mouse 664, and a network interface 666 via interface 624, smart TV 676, consumer electronics 677, etc.

In one embodiment, mass storage device 662 includes, but is not limited to, a solid state drive, a hard disk drive, a universal serial bus flash memory drive, or any other form of computer data storage medium. In one embodiment, network interface 666 is implemented by any type of well-known network interface standard including, but not limited to, an Ethernet interface, a universal serial bus (USB) interface, a Peripheral Component Interconnect (PCI) Express interface, a wireless interface and/or any other suitable type of interface.

FIG. 6 also includes a controller 690 (e.g., embedded controller of FIG. 1A) coupled to processor 610 via bus 695. In one embodiment, bus 695 is a platform control bus (e.g., PECI bus). In another embodiment, bus 695 is a I2C bus.

While the modules shown in FIG. 6 are depicted as separate blocks within the system 600, the functions performed by some of these blocks may be integrated within a single semiconductor circuit or may be implemented using two or more separate integrated circuits.

In a first example embodiment, an integrated circuit (IC) device comprises: a controller operable to receive a command from a platform control bus, the command requesting data that is unrelated to information about a power state in which the IC resides; and control logic operable to obtain data for inclusion in a response to the command, wherein the controller is operable to send the response over a bus, the response containing at least a portion of the data responsive to the command and containing power state information for the IC.

In another example embodiment, the subject matter of the first example embodiment can optionally include that the power state information indicates whether the IC is currently in one or more reduced power consumption states, and further wherein the control logic is operable to obtain the data for inclusion in the response without having the IC leave a power state in which the IC currently resides. In another example embodiment, the subject matter of this example embodiment can optionally include that the one or more reduced power consumption states comprises one or more deep sleep states selected from a group of C8, C9 and C10 C-states.

In another example embodiment, the subject matter of the first example embodiment can optionally include that the bus is a platform control bus. In another example embodiment, the subject matter of this example embodiment can optionally include that the platform control bus comprises a Platform Environment Control Interface (PECI) bus and the controller comprises a PECI controller.

In another example embodiment, the subject matter of the first example embodiment can optionally include that the power state information comprises a bit in the response.

In another example embodiment, the subject matter of the first example embodiment can optionally include that the command comprises a temperature command to obtain temperature data for the IC, and further wherein the response includes the power state information in a least significant bit (LSB) in place of another bit of the temperature data.

In another example embodiment, the subject matter of the first example embodiment can optionally include logic operable to set the power state information after a determination to enter a reduced power consumption state has been made yet prior to entry into the reduced power consumption state.

In another example embodiment, the subject matter of the first example embodiment can optionally include that the command comprises a temperature command to obtain temperature data for the IC.

In another example embodiment, the subject matter of the first example embodiment can optionally include that the controller is operable to send the power state information using in-band signaling.

In another example embodiment, the subject matter of the first example embodiment can optionally include one or more processor cores, and wherein the control logic comprises power control logic coupled to the one or more processor cores.

In a second example embodiment, a method comprises receiving, by an integrated circuit (IC), a command from a bus, the command requesting data that is unrelated to information about a power state in which the IC resides; and sending a response to the command over the bus with the power state information using in-band signaling, the response containing at least a portion of the data responsive to the command and containing power state information for the IC.

In another example embodiment, the subject matter of the second example embodiment can optionally include that the power state information indicates whether the IC is currently in one or more reduced power consumption states, and further comprising obtaining data for inclusion in the response without having the IC leave a power state in which the IC currently resides. In another example embodiment, the subject matter of this example embodiment can optionally include that the one or more reduced power consumption states comprises one or more deep sleep states selected from a group of C8, C9 and C10 C-states.

In another example embodiment, the subject matter of the second example embodiment can optionally include that the command comprises a temperature command to obtain temperature data for the IC.

In another example embodiment, the subject matter of the second example embodiment can optionally include that the bus comprises a platform control bus. In another example embodiment, the subject matter of this example embodiment can optionally include that the platform control bus comprises a Platform Environment Control Interface (PECI) bus.

In another example embodiment, the subject matter of the second example embodiment can optionally include that the power state information comprises a bit in the response.

In another example embodiment, the subject matter of the second example embodiment can optionally include that the command comprises a temperature command to obtain temperature data for the IC, and further comprising including the power state information in a least significant bit (LSB) of the response in place of another bit of the temperature data.

In another example embodiment, the subject matter of the second example embodiment can optionally include setting the power state information after a determination to enter a reduced power consumption state has been made yet prior to entry into the reduced power consumption state.

In a third example embodiment, a system comprises: a first bus; a first controller coupled to the first bus; an integrated circuit (IC) device coupled to the bus, wherein the IC comprises a second controller operable to receive a command from the first controller via the first bus, the command requesting data that is unrelated to information about a power state in which the IC resides, and control logic operable to obtain data for inclusion in a response to the command, where the second controller is operable to send the response over the platform first bus, the response containing at least a portion of the data responsive to the command and containing power state information for the IC.

In another example embodiment, the subject matter of the third example embodiment can optionally include that the power state information indicates whether the IC is currently in one or more reduced power consumption states, and further wherein the control logic is operable to obtain the data for inclusion in the response without having the IC leave a power state in which the IC currently resides.

In another example embodiment, the subject matter of the third example embodiment can optionally include that the one or more reduced power consumption states comprises one or more deep sleep states selected from a group of C8, C9 and C10 C-states.

In another example embodiment, the subject matter of the third example embodiment can optionally include that the first bus comprises a Platform Environment Control Interface (PECI) bus and the second controller comprises a PECI controller.

In another example embodiment, the subject matter of the third example embodiment can optionally include that the controller is a part of a node manager.

In another example embodiment, the subject matter of the third example embodiment can optionally include a bridge coupled to the second controller via the first bus, and a second bus coupling the first controller to the bridge. In another example embodiment, the subject matter of this example embodiment can optionally include that the bridge is operable to provide the power state information to the embedded controller that was previously obtained and cached.

In a fourth example embodiment, an article of manufacture has one or more non-transitory computer readable media storing instructions which, when executed by a system, cause the system to perform a method comprising: receiving, by an integrated circuit (IC), a command from a bus, the command requesting data that is unrelated to information about a power state in which the IC resides; and sending a response to the command over the bus with the power state information using in-band signaling, the response containing at least a portion of the data responsive to the command and containing power state information for the IC.

In another example embodiment, the subject matter of the fourth example embodiment can optionally include that the power state information indicates whether the IC is currently in one or more reduced power consumption states, and further comprising obtaining data for inclusion in the response without having the IC leave a power state in which the IC currently resides.

In another example embodiment, the subject matter of the fourth example embodiment can optionally include that the one or more reduced power consumption states comprises one or more deep sleep states selected from a group of C8, C9 and C10 C-states.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. An integrated circuit (IC) device comprising:
a controller operable to receive a command from a platform control bus, the command includes a request for data from the IC in a power saving mode state unrelated to a request for a power state status of the IC; and
control logic operable to obtain data for inclusion in a response to the request for data in the command,
wherein the controller is operable to send the response over a bus, the response includes at least a portion of data responsive to the request for data in the command and includes power state information of a power state status of the IC in place of other data responsive to the command that would be sent in response to the command but for inclusion of the power state information, and wherein the controller sends the power state status of the IC included in the response without the IC having to exit from the power saving mode state.

2. The device defined in claim 1 wherein the power state information indicates whether the IC is currently in one or more reduced power consumption states, and further wherein the control logic is operable to obtain the data for inclusion in the response without having the IC leave a power state in which the IC currently resides.

3. The device of claim 2 wherein the one or more reduced power consumption states comprises one or more deep sleep states selected from a group of C8, C9 and C10 C-states.

4. The device defined in claim 1 wherein the bus is a platform control bus.

5. The device defined in claim 4 wherein the platform control bus comprises a Platform Environment Control Interface (PECI) bus and the controller comprises a PECI controller.

6. The device defined in claim 1 wherein the power state information comprises a bit in the response.

7. The device defined in claim 1 wherein the command comprises a temperature command to obtain temperature data for the IC, and further wherein the response includes the power state information in a least significant bit (LSB) in place of another bit of the temperature data.

8. The device defined in claim 1 further comprising logic operable to set the power state information after a determination to enter a reduced power consumption state has been made yet prior to entry into the reduced power consumption state.

9. The device defined in claim 1 wherein the command comprises a temperature command to obtain temperature data for the IC.

10. The device defined in claim 1 wherein the controller is operable to send the power state information using in-band signaling.

11. The device defined in claim 1 further comprising one or more processor cores, and wherein the control logic comprises power control logic coupled to the one or more processor cores.

12. A method comprising:
receiving, by an integrated circuit (IC), a command from a bus, the command requesting data from the IC in a power saving mode state unrelated to a request for a power state status of the IC; and
sending a response to the command requesting data over the bus including power state information of a power state status of the IC using in-band signaling, the response including at least a portion of data responsive to the command requesting data and including power state information for the IC in place of other data responsive to the command that would be sent in response to the command but for inclusion of the power state information, wherein the power state status of the IC included in the response is sent without the IC having to exit the power saving mode state.

13. The method defined in claim 12 wherein the power state information indicates whether the IC is currently in one or more reduced power consumption states, and further comprising obtaining data for inclusion in the response without having the IC leave a power state in which the IC currently resides.

14. The method of claim 13 wherein the one or more reduced power consumption states comprises one or more deep sleep states selected from a group of C8, C9 and C10 C-states.

15. The method defined in claim 13 wherein the command comprises a temperature command to obtain temperature data for the IC.

16. The method defined in claim 12 wherein the bus comprises a platform control bus.

17. The method defined in claim 16 wherein the platform control bus comprises a Platform Environment Control Interface (PECI) bus.

18. The method defined in claim 12 wherein the power state information comprises a bit in the response.

19. The method defined in claim 12 wherein the command comprises a temperature command to obtain temperature data for the IC, and further comprising including the power state information in a least significant bit (LSB) of the response in place of another bit of the temperature data.

20. The method defined in claim 12 further comprising setting the power state information after a determination to enter a reduced power consumption state has been made yet prior to entry into the reduced power consumption state.

21. A system comprising:
a first bus;
a first controller coupled to the first bus;
an integrated circuit (IC) device coupled to the first bus, wherein the IC comprises
a second controller operable to receive a command from the first controller via the first bus, the command requesting data from the IC in a power saving mode state unrelated to a request for a power state status of the IC, and control logic operable to obtain data for inclusion in a response to the command requesting data, wherein the second controller is operable to send the response over the first bus, the response includes at least a portion of data responsive to the command requesting data and includes power state information of a power state status of the IC in place of other data responsive to the command that would be sent in response to the command but for inclusion of the power state information, wherein the second controller sends the power state status of the IC included in the response without the IC having to exit from the power saving mode state.

22. The system defined in claim 21 wherein the power state information indicates whether the IC is currently in one or more reduced power consumption states, and further wherein the control logic is operable to obtain the data for inclusion in the response without having the IC leave a power state in which the IC currently resides.

23. The system of claim 21 wherein the one or more reduced power consumption states comprises one or more deep sleep states selected from a group of C8, C9 and C10 C-states.

24. The system defined in claim 21 wherein the first bus comprises a Platform Environment Control Interface (PECI) bus and the second controller comprises a PECI controller.

25. The system defined in claim 21 wherein the controller is a part of a node manager.

26. The system defined in claim 21 further comprising:
a bridge coupled to the second controller via the first bus; and
a second bus coupling the first controller to the bridge.

27. The system defined in claim 26 wherein the bridge is operable to provide the power state information to the embedded controller that was previously obtained and cached.

28. An article of manufacture having one or more non-transitory computer readable media storing instructions which, when executed by a system, cause the system to perform a method comprising:
receiving, by an integrated circuit (IC), a command from a bus, the command requesting data from the IC in a power saving mode state unrelated to a request for a power state status of the IC; and
sending a response to the command requesting data over the bus including power state information of a power state status of the IC using in-band signaling, the response including at least a portion of data responsive to the command requesting data and including power state information for the IC in place of other data responsive to the command that would be sent in response to the command but for inclusion of the power state information, wherein the power state status of the IC included in the response is sent without the IC having to exit from the power saving mode state.

29. The article of manufacture defined in claim 28 wherein the power state information indicates whether the IC is currently in one or more reduced power consumption states, and further comprising obtaining data for inclusion in the response without having the IC leave a power state in which the IC currently resides.

30. The article of manufacture of claim 29 wherein the one or more reduced power consumption states comprises one or more deep sleep states selected from a group of C8, C9 and C10 C-states.

* * * * *